United States Patent [19]
Day, III

[11] Patent Number: 6,047,983
[45] Date of Patent: Apr. 11, 2000

[54] PORTABLE COMBINATION HAND TRUCK AND VALISE

[76] Inventor: Albert George Day, III, 9403 Emanuel Rd., Fort Wayne, Ind. 46816

[21] Appl. No.: 08/925,705

[22] Filed: Sep. 9, 1997

[51] Int. Cl.$^7$ ........................................................ B62B 1/02
[52] U.S. Cl. ...................... 280/652; 280/47.26; 280/79.6
[58] Field of Search ..................................... 280/639, 651, 280/652, 47.17, 47.18, 47.19, 47.21, 47.24, 47.28, 79.6, 79.2, 79.3

[56] References Cited

U.S. PATENT DOCUMENTS

| | | |
|---|---|---|
| 1,408,400 | 2/1922 | Richards . |
| 1,432,037 | 5/1922 | Russel . |
| 3,064,990 | 11/1962 | Salvucci . |
| 3,064,991 | 11/1962 | Huthsing, Jr. . |
| 4,253,716 | 3/1981 | Turner, Jr. ................................ 312/100 |
| 4,521,030 | 6/1985 | Vance ......................................... 280/42 |
| 4,666,179 | 5/1987 | Adams ..................................... 280/655 |
| 4,692,953 | 9/1987 | Fetters ........................................ 5/99 R |
| 4,753,445 | 6/1988 | Ferrare ................................... 280/47.13 |
| 4,815,761 | 3/1989 | Henderson et al. ................... 280/47.3 |
| 5,020,814 | 6/1991 | George et al. ......................... 280/204 |
| 5,131,670 | 7/1992 | Clements et al. ....................... 280/35 |
| 5,431,422 | 7/1995 | Gamache ............................. 280/47.19 |
| 5,492,346 | 2/1996 | Stadler et al. ......................... 280/79.6 |
| 5,570,895 | 11/1996 | McCae et al. ......................... 280/79.6 |
| 5,577,746 | 11/1996 | Britton .................................. 280/204 |
| 5,806,808 | 9/1998 | Collins .................................. 280/79.6 |

Primary Examiner—Richard M. Camby
Attorney, Agent, or Firm—Paul W. O'Malley; Susan L. Firestone

[57] ABSTRACT

A collapsible hand truck providing self stowage for components of the hand truck upon disassembly, comprising a hinged double shell foldable between a closed position defining a tube like enclosure and an open position providing a frame for the hand truck.

10 Claims, 3 Drawing Sheets

PORTABLE COMBINATION HAND TRUCK AND VALISE

FIELD OF THE INVENTION

The present invention relates to a hand truck, and, more particularly, to a hand truck which collapses into a portable valise for easy stowage and carriage.

BACKGROUND TO THE INVENTION

The sport of scuba diving entails the use of a considerable quantity of equipment. Divers will typically have, at a minimum, heavy compressed air tanks, fins, weight belts, face masks, regulators and a buoyancy jacket. He or she may add a camera, nets, spear guns, dive tables and other equipment chosen to add interest to the dive. Depending on environmental conditions a diver may wish to take a dry or wet suit. Together, equipment which is easily handled when worn by the diver under water is weighty, bulky and difficult to carry over land.

On land is where most diving adventures begin. The diver who can park his motor vehicle close by water or dock, and not have to carry his or her equipment a considerable distance across parking lots, beaches, or along country roads is fortunate. Where the diver has a long trek to boat or water, moving equipment becomes a tiring, time consuming project.

The problems divers face in hauling equipment from car or other land transport to water's edge have been addressed in diverse ways by other inventors. U.S. Pat. No. 4,815,761 emphasizes the needs of divers who make dives directly from water's edge after a long and potentially rugged hike to the location of the dive. The patent teaches a caddie designed to assist the land transport of tanks and gear, across both hard surfaces and soft surfaces, and up and down rugged terrain or stairs. The caddie is also adapted to provide a floating platform marking the dive location. The caddie is based on a quadrilateral frame, fabricated from hollow tubing. Handler units and roller units are disposed at opposite ends of the frame. Both the handler unit and the roller unit include buoyant elements for flotation.

U.S. Pat. No. 5,131,670 recognizes the need for a simple, light weight aid for moving scuba tanks. The patent teaches a device comprising two "tank engaging members", which working together provide a clasping, spring loaded frame for attachment to the bottom of tanks. An axle and two wheels are mounted to the tank engaging members. In essence, the device provides for the quick attachment of a pair of wheels to a scuba tank. The device is compact, and provides nesting of one engaging member with the other when removed from a tank. However, the device is limited to hauling a single compressed air tank.

U.S. Pat. No. 5,492,346 teaches a Scuba Tote providing a wheeled base with retractable handle. The base provides an enclosure, the details of which are unspecified, but which may be used for the stowage of equipment, and a cover for the enclosure which has exterior recesses for receiving and partially supporting scuba tanks. The device is relatively bulky and, other than a retractable handle, not collapsible.

SUMMARY OF THE INVENTION

The present inventor has as a principal object of his invention providing a hand truck for carrying scuba equipment and particularly scuba tanks from surface transportation to boat side or water's edge and back.

It is another object of the invention that the hand truck be collapsible for easy stowage, particularly on a boat.

It is still another object of the invention that the truck allow ready assembly and disassembly for converting the device back and forth between a hand truck and a valise.

The foregoing objects are achieved as is now described. A collapsible hand truck providing self stowage for components of the hand truck upon disassembly comprises a hinged double shell foldable between a closed position defining a tube like enclosure and an open position providing a frame for the hand truck. An axle is sized to fit within the tube like enclosure and positionable through the hinged double shell in the open position for locking the hinged double shell in the open position. A pair of wheels are sized to fit within the tube like enclosure and adapted for easy attachment to and detachment from the axle. A lateral carrier may be attached over the axle through the hinged double shell in the open position. A handle is attachable to the hinged double shell in the open position.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
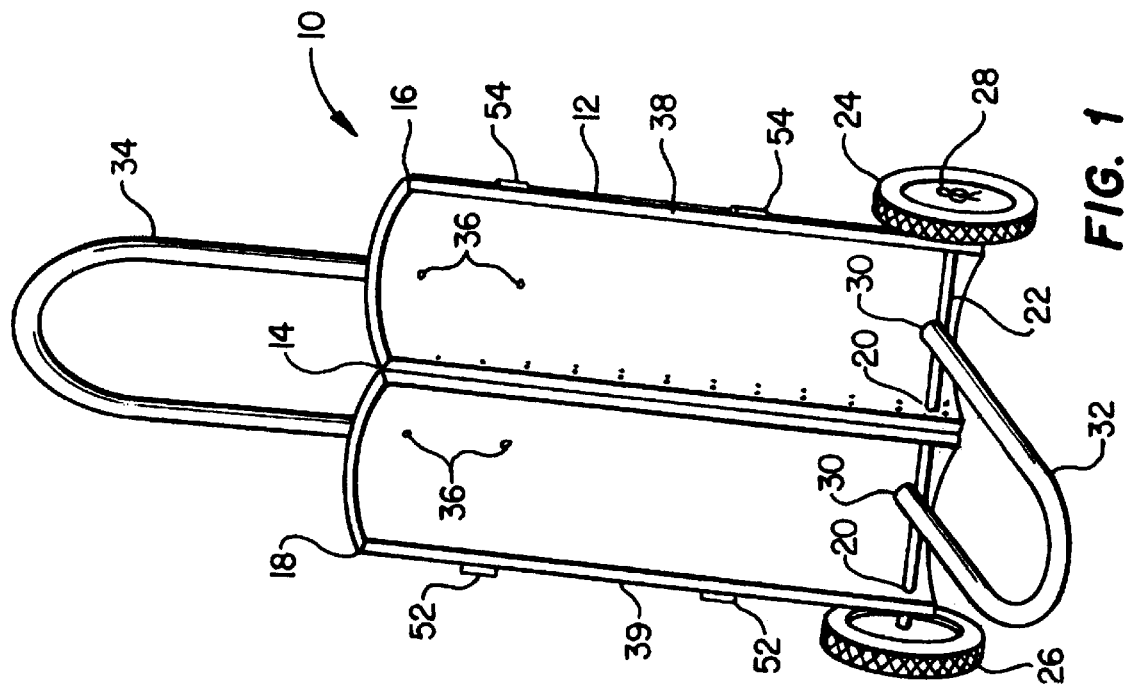
FIG. 1 is a perspective view of a collapsible hand truck of the present invention.

With reference now to the figures and in particular with reference to FIG. 1, there is depicted the preferred embodiment of a collapsible hand truck 10. Collapsible hand truck 10 comprises a double shell 12, opened on a longitudinal hinge 14. Double shell 12 is elongated and includes first and second half cylindrical sections 16 and 18 connected along one lengthwise edge on the respective sections by longitudinal hinge 14. Half cylindrical sections 16 and 18 may be fabricated by cutting 8" polyvinylcholride (PVC) pipe to the desired length and lengthwise into the two half cylindrical sections. The diameter of PVC pipe is chosen for its close fit to the circumference of Super 80 scuba tanks. Using PVC pipe makes half cylindrical sections 16 and 18 rigid and self supporting and provides a frame for the attachment of the remaining components of hand truck 10 as well as providing recesses for cradling scuba tanks.

A variety of detachable components are mounted to double shell 12 to complete the easily handled hand truck 10 for manual transportation or locomotion. Double shell 12 is opened lengthwise on hinge 14 bringing into alignment a series of holes 20 through the lower portions of half cylindrical sections 16 and 18. An axle 22 is fitted through holes 20 with its ends extending outwardly from both sides of double shell 12. A pair of wheels 24 and 26 are fitted over the ends of axle 20 with each wheel held in place by a removable cotter pin such as pin 28 for wheel 24. A handle 34 is attached to the backside of double shell 12 using screws 36 extending through half cylindrical sections 16 and 18 to engage the handle, as described in greater detail below. The heads of screws 36 are preferably flush with the interior faces of half cylindrical sections 16 and 18.

A lateral carrier 32 is a U-shaped bent tube extending from and through openings 30 in each of half cylindrical sections 16 and 18. Carrier 32 rests on axle 22 and provides a support for scuba tanks, dive bags or other gear. Cooperating latch portions 52 and 54 are located along half cylindrical section edges 39 and 38, respectively, to provide secure closure of the valise structure when mutually engaged.

Figure 2:
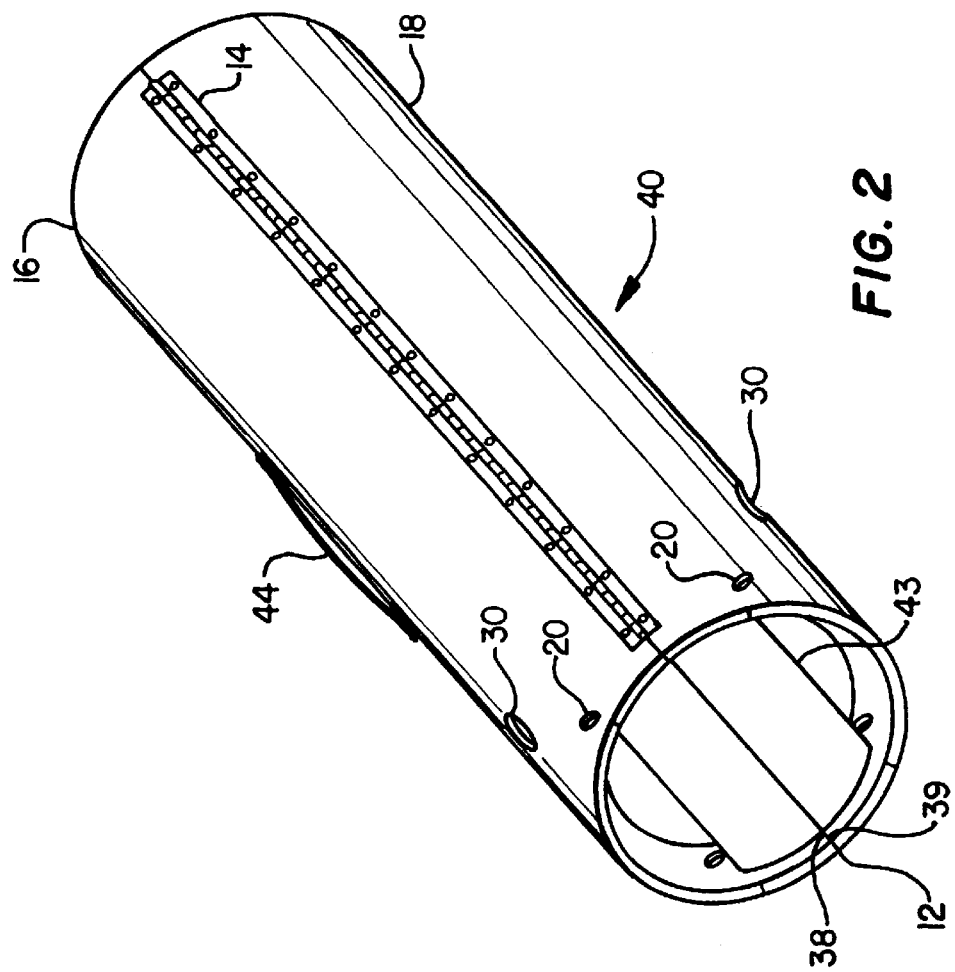
FIG. 2 is a perspective view of a valise formed upon dismantling the collapsible hand truck of FIG. 1 and folding the shells upon one another.

FIG. 2 illustrates in perspective view a valise 40 formed from double shell 12 upon removal of the detachable components of hand truck 10 and the folding of half cylindrical sections 16 and 18 on hinge 14 until they meet along edges 38 and 39. The opposite ends of the resulting cylinder are closed by plugs, with end plug or closure 43 shown fitted between the half cylindrical sections 16 and 18. Alternatively, the opposite ends of valise 40 may be closed by boots fitted over the outside of half cylindrical sections 16 and 18. The interior faces of half cylindrical sections 16 and 18 may be grooved to receive end plug 42. Wheels 24 and 26, carrier 32 and handle 34 may be stored inside valise 40. A strap handle 44 is attached to an exterior face of half cylindrical section 18. Openings 30 provide for ventilation of valise 40.

Figure 3:
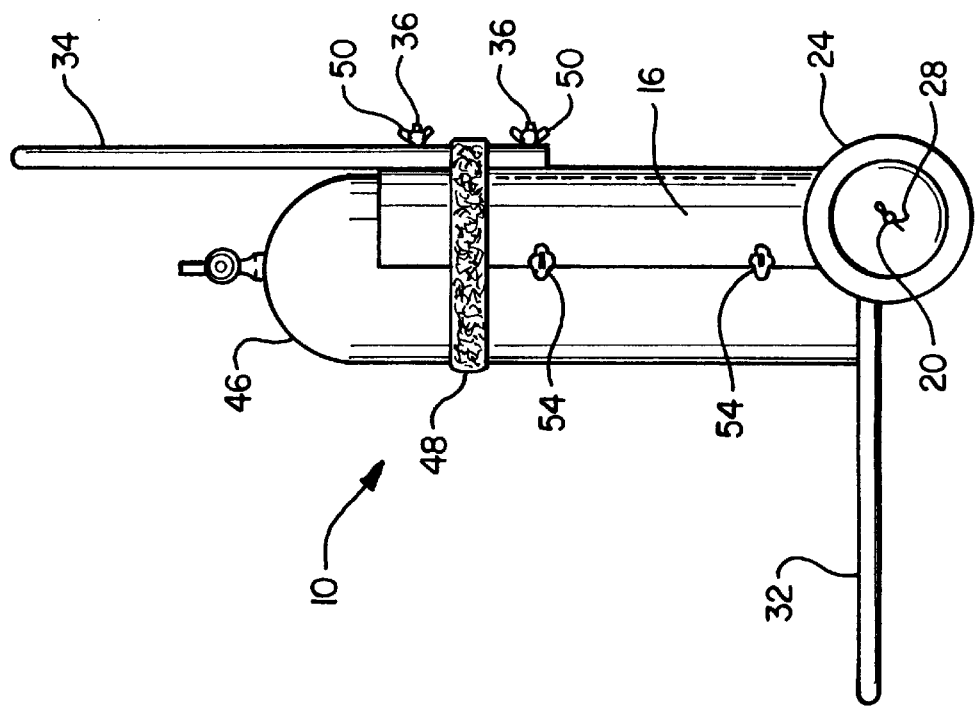
FIG. 3 is a side elevation view of a preferred embodiment of the invention carrying a scuba tank.

Referring to FIG. 3, hand truck 10 is depicted carrying a scuba tank 46. Tank 46 is secured within half cylindrical section 16 by a strap 48, which is wrapped around the scuba tank, the exterior of the half cylindrical section and the lower portion of handle 34. The bottom of tank 46 rests on lateral carrier 32. Handle 34 is mounted to the back of double shell 12 by screws 36 and secured in position by wing nuts 50 fastened to the screws.

Figure 4:
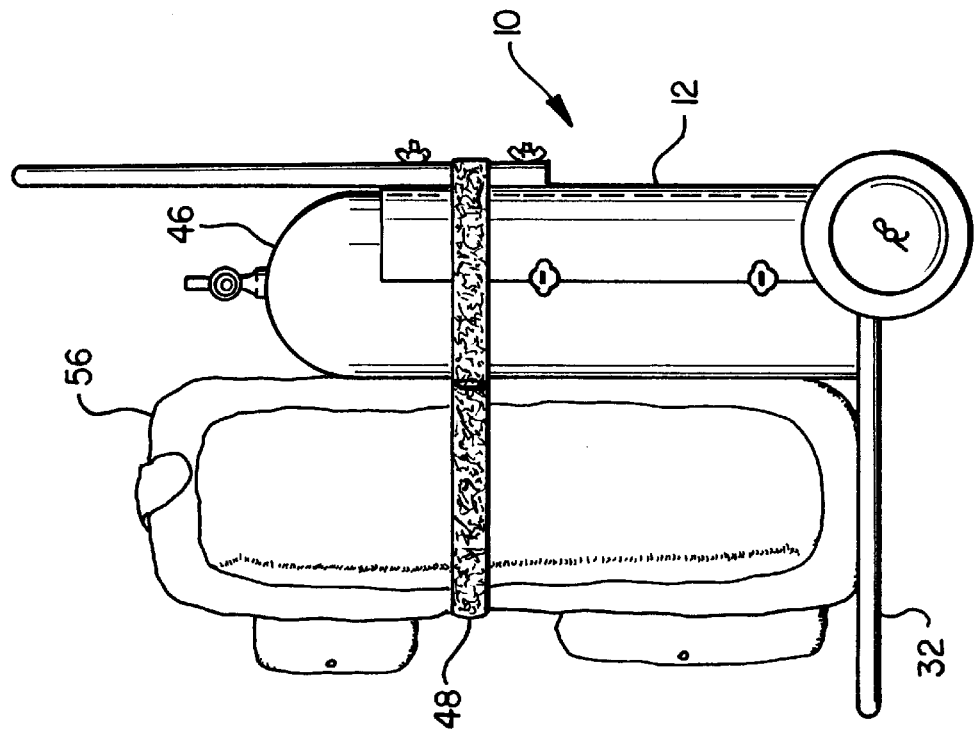
FIG. 4 is a side elevation view of the invention with now carrying a tank and a dive bag.

FIG. 4 depicts loading of hand truck 10 with a tank 46 and a dive bag 56. Strap 48 is extended to secure both tank 46 and bag 56 to double shell 12.

Figure 5:
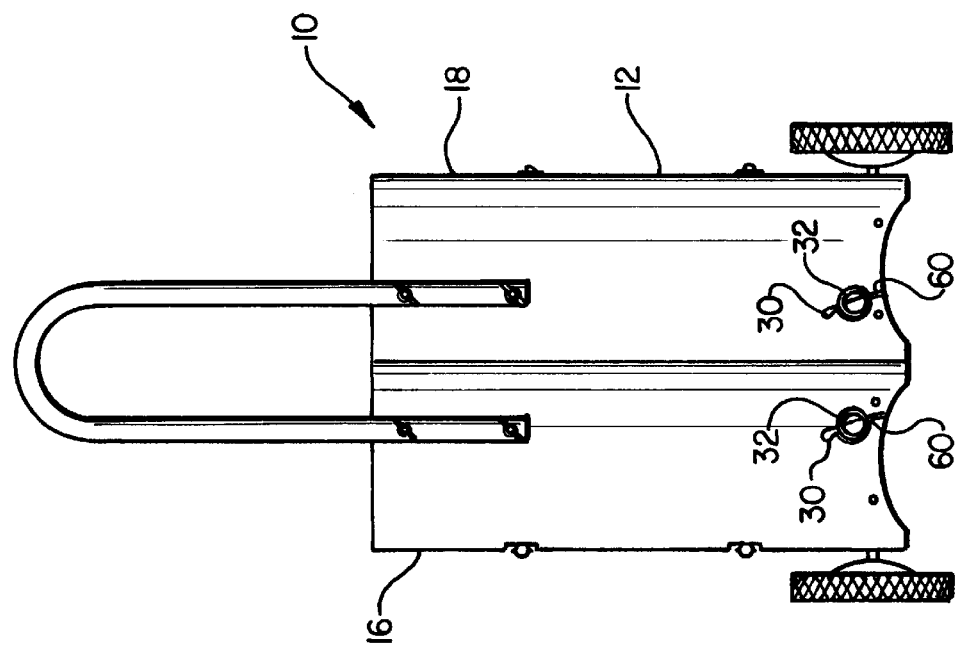
FIG. 5 is a rear elevation view of the preferred embodiment of the invention.

FIG. 5 illustrates attachment of lateral carrier 32 to the back face of double shell 12 of hand truck 10. Lateral carrier 32 is fabricated from a one or two piece U-shaped bent metal pipe. The ends of carrier 32 are positioned through openings 30 in half cylindrical sections 16 and 18, extending outwardly from the rear face of double shell 12 sufficiently far to allow cotter pin 60, a screw and wing nut arrangement, or any other suitable securing means, to be positioned through the ends of the carrier to secure lateral carrier 32 in position. Retainers may be applied to each leg of carrier 32 to prevent the carrier from being over inserted through openings 30.

Figure 6:
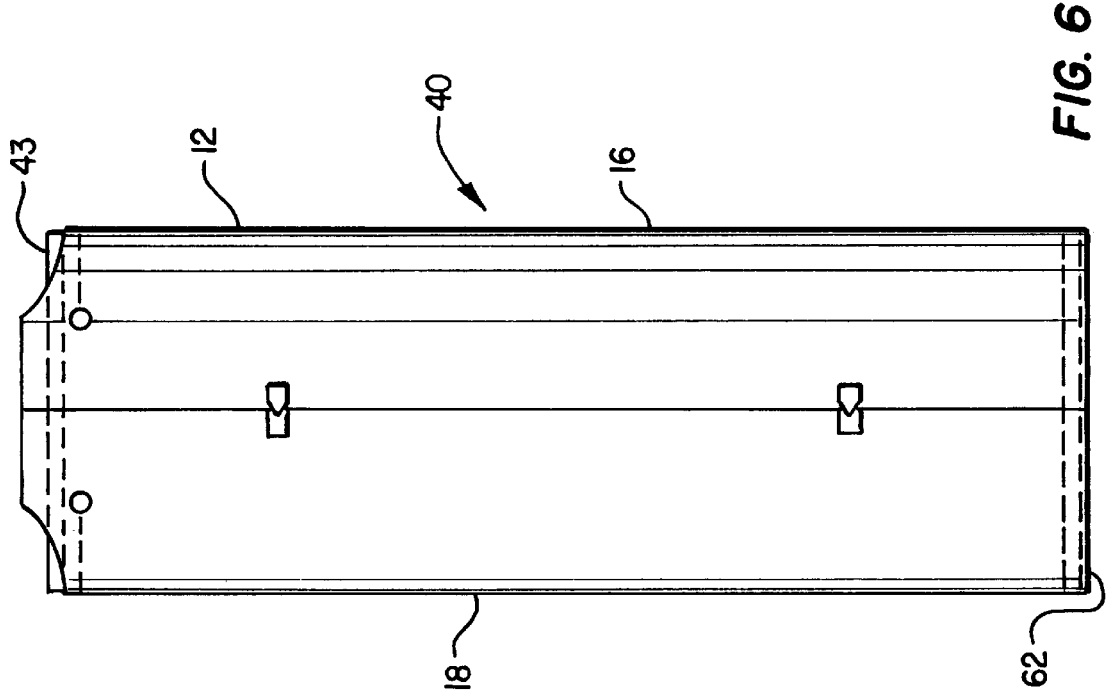
FIG. 6 is a side plan view of the valise structure showing the positioning of end plugs.

FIG. 6 depicts closures 43 and 62 (shown in shadow) for opposite ends of the cylindrical structure of one embodiment on valise 40. Closures 43 and 62 are essentially disk like pieces which fit fully or partly within the cylindrical body of valise 40. Closures 43 and 62 may be sized to fit snugly within the closed double shell 12. Alternatively, the interior faces of half cylindrical sections 16 and 18 may be grooved to fit slightly oversized closures 43 and 62.

The present invention provides a collapsible hand truck for carrying scuba equipment and particularly scuba tanks from surface transportation to boat side or water's edge and back. The hand truck is easily dismantled for stowage as a valise in either car or boat. Either hand truck or valise is of light weight and the device allows ready assembly and disassembly for converting the device back and forth between a hand truck and a valise.

While the invention is shown in only one of its forms, it is not thus limited but is susceptible to various changes and modifications without departing from the spirit and scope of the invention.

What is claimed is:

1. Apparatus comprising:
   first and second elongated cradles;
   a hinge, connecting the first and second elongated cradles in parallel in the direction of elongation, and allowing the first and second elongated cradles to be closed on one another or opened;
   a handle for attachment to the first and second elongated cradles;
   an axle;
   a plurality of openings in the first and second cradles which align when the first and second elongated cradles are opened to admit the axle; and
   first and second wheels for detachable mounting on opposite ends of the axle.

2. Apparatus as set forth in claim 1, and further comprising:
   a transverse load carrier detachably depending from the first and second elongated cradles.

3. Apparatus as set forth in claim 1, wherein the first and second elongated cradles are made of a rigid and self supporting polymer material.

4. Apparatus as set forth in claim 3, wherein the polymer material is polyvinylchloride.

5. A collapsible hand truck providing self stowage for components of the hand truck upon disassembly comprising:
   a hinged double shell foldable between a closed position defining a tube like enclosure and an open position;
   an axle sized to fit within the tube like enclosure and fittable to the hinged double shell in the open position for locking the hinged double shell in the open position;
   a pair of wheels sized to fit within the tube like enclosure and adapted for easy attachment to and detachment from the axle;
   a horizontal brace attachable through the hinged double shell in the open position over the axle; and
   a handle attachable to the hinged double shell in the open position.

6. A collapsible hand truck as claimed in claim 5, wherein the hinged double shell comprises first and second half cylindrical sections.

7. A combination hand truck and valise comprising:
   a hinge;
   a double shell connected along an edge by the hinge, the double shell forming an enclosed structure when closed on the hinge and opening into first and second elongated cradles;
   means for bracing the first and second elongated cradles in an opened position to form a frame for the hand truck;
   first and second closures for the opposite ends of the enclosed structure; and
   detachable means for providing manual locomotion of the hand truck.

8. The combination hand truck and valise of claim 7, wherein the means for providing manual locomotion comprise:

a handle; and first and second wheels for mounting to the axle.

9. The combination hand truck and valise of claim 8, further comprising:

a lateral carrier extending from the first and second elongated cradles over the fitted axle.

10. The combination hand truck and valise of claim 9, wherein the means for bracing includes an axle fitable through the first and second elongated cradles in the opened position.

* * * * *

UNITED STATES PATENT AND TRADEMARK OFFICE
CERTIFICATE OF CORRECTION

PATENT NO. : 6,047,983
DATED : April 11, 2000
INVENTOR(S) : Day, III

It is certified that error appears in the above-identified patent and that said Letters Patent is hereby corrected as shown below:

Claim 10 is renumbered as 8 and depends from Claim 7.

Claim 8 is renumbered as Claim 9 and depends from Claim 8.

Claim 9 is renumbered as Claim 10 and depends from Claim 9.

Signed and Sealed this

Nineteenth Day of June, 2001

*Attest:*

NICHOLAS P. GODICI
*Attesting Officer*   *Acting Director of the United States Patent and Trademark Office*